United States Patent
Brewster

(10) Patent No.: US 6,974,164 B2
(45) Date of Patent: Dec. 13, 2005

(54) LATCH DEVICE FOR SECURING CARGO CONTAINERS

(75) Inventor: John B. Brewster, Homewood, IL (US)

(73) Assignee: Holland LP, Crete, IL (US)

( * ) Notice: Subject to any disclaimer, the term of this patent is extended or adjusted under 35 U.S.C. 154(b) by 0 days.

(21) Appl. No.: 10/211,660

(22) Filed: Aug. 2, 2002

(65) Prior Publication Data

US 2003/0034654 A1 Feb. 20, 2003

Related U.S. Application Data

(60) Provisional application No. 60/310,152, filed on Aug. 3, 2001.

(51) Int. Cl.[7] .................................................. E05C 5/00
(52) U.S. Cl. ........................ 292/109; 292/104; 410/70
(58) Field of Search ........................... 292/109, 110, 292/114, 121, 128, DIG. 32; 410/69, 70–76

(56) References Cited

U.S. PATENT DOCUMENTS

| | | | | |
|---|---|---|---|---|
| 1,751,571 A | * | 3/1930 | Anderson | 292/101 |
| 2,926,945 A | * | 3/1960 | Clark | 292/332 |
| 3,207,544 A | * | 9/1965 | Miller | 292/109 |
| 3,365,229 A | | 1/1968 | Hitch et al. | |
| 3,603,267 A | | 9/1971 | Schwiebert | |
| 3,604,363 A | | 9/1971 | Smith | |
| 3,604,364 A | | 9/1971 | Sweger | |
| 3,628,222 A | | 12/1971 | Palen | |
| 3,630,155 A | | 12/1971 | Marullic et al. | |
| 3,670,663 A | * | 6/1972 | Sweger | 105/366 C |
| 3,774,551 A | | 11/1973 | Sweger | |
| 4,236,853 A | | 12/1980 | Niggemeier et al. | |
| 4,277,212 A | | 7/1981 | Rosaia | |
| 4,372,715 A | | 2/1983 | Naffa | |
| 4,382,734 A | | 5/1983 | Synowiec et al. | |
| 4,382,735 A | | 5/1983 | Synowiec | |
| 4,430,032 A | | 2/1984 | Morgan | |
| 4,626,155 A | | 12/1986 | Hlinsky et al. | |
| 5,090,638 A | | 2/1992 | Eilenstein-Wiegmanns | |
| 5,106,247 A | | 4/1992 | Hove et al. | |
| 5,560,088 A | | 10/1996 | Nitsche et al. | |
| 5,570,981 A | | 11/1996 | Brewster | |
| 5,613,814 A | * | 3/1997 | Jackson | 410/70 |
| 5,775,140 A | * | 7/1998 | Hallsten | 70/85 |
| 5,797,169 A | | 8/1998 | Donner et al. | |

FOREIGN PATENT DOCUMENTS

CA               589031           12/1959

* cited by examiner

*Primary Examiner*—Gary Estremsky
(74) *Attorney, Agent, or Firm*—David C. Brezina; Barnes & Thornburg LLP

(57) ABSTRACT

A cargo container hold down device that includes a latch and spring used in a housing defined by a base that forms a surface thereabout on which cargo container corner fittings rests in the applied relation on the container relative to the supporting structure or platform involved, further including a bottom end that interfaces with a deck or vehicle structure for retention of the hold down device so the opposite side of the hold down device is allowed to automatically engage and disengage with a cargo container corner fitting as necessary to achieve proper handling and transport of cargo containers, the device using a latch on a pin, the pin carried in a pocket such that the latch force varies as a function of container position and movement, thereby enabling the use of a single spring in a low profile lock.

9 Claims, 4 Drawing Sheets

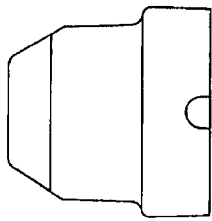
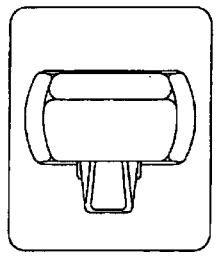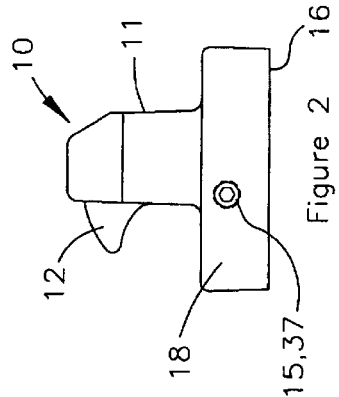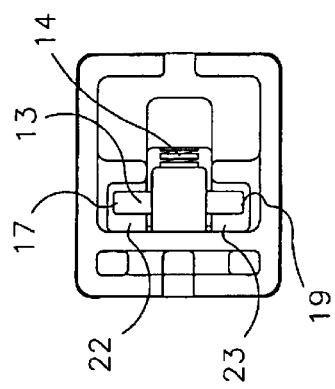
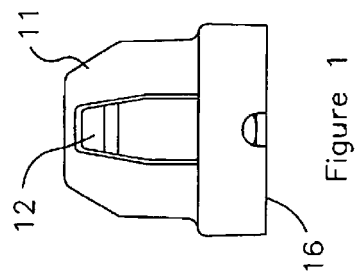

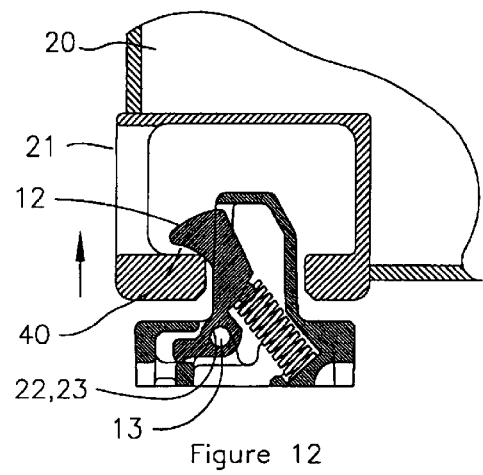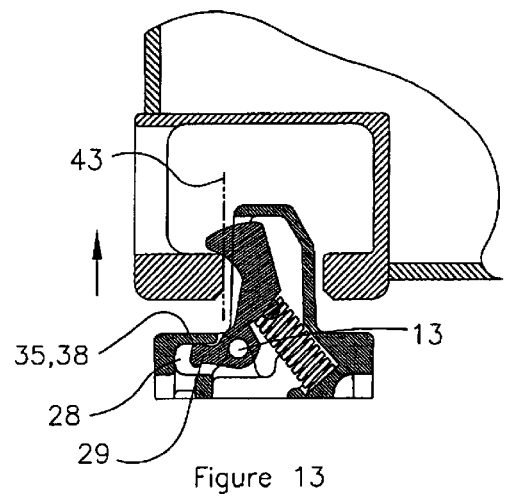
Figure 12
Figure 13
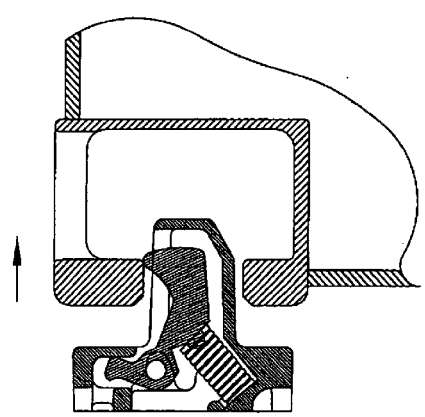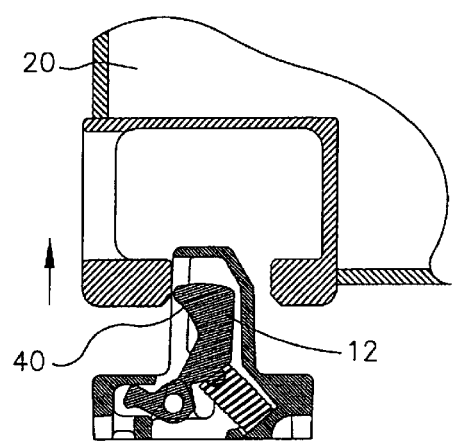
Figure 14
Figure 15

LATCH DEVICE FOR SECURING CARGO CONTAINERS

CLAIM OF PRIORITY

Priority is claimed based on U.S. Provisional Application Ser. No. 60/310,152 filed Aug. 3, 2002, entitled "Latch Device for Securing Cargo Containers" and having the same inventor identified herein.

BACKGROUND OF THE INVENTION

The invention relates to container securement devices, and more particularly, to improvements in cargo container securement devices of the type that provide automatic securement and release of a cargo container. The device is mountable on a deck or frame of a vehicle or similar surface as desired so that the device can be adapted to different load conditions including a different mix of containers of different length and the like.

This latch device can be used to hold a cargo container onto a vehicle deck such as a railroad car deck. The device can be adapted to hold two cargo containers together such as in the case of double stacking containers. Four latch devices are used to fasten the four corner castings or fittings of a cargo container to a vehicle deck or similar surface. The container's four bottom corner fittings are brought into contact with the top end of the latch device, thereby sliding over the top of the housing and engaging the protruding latch. A cargo container can be removed when the bottom lip of the corner fitting or casting contacts the concave underside of the upper portion of the latch and overcomes the latch's resistance while the container is being pulled off the housing.

A latch device that may be used wherever the present device can be used is illustrated in U.S. Pat. No. 5,570,981. U.S. Pat. No. 5,570,981 is incorporated herein by reference. The present latch device has fewer parts than what is illustrated in U.S. Pat. No. 5,570,981. The present latch device only has one internal resilient spring, whereas the device in U.S. Pat. No. 5,570,981 has two internal resilient springs. One spring of U.S. Pat. No. 5,570,981 may use a material whose stiffness varies and changes with temperature more than a metal type material. Spring stiffness is directly related to the device's engaging and releasing forces of the cargo container. With a single spring made of metal, the spring stiffness rate does not vary as greatly as with a second material of a second spring. The elimination of the second spring permits the engaging and releasing of cargo containers with the desired force over a greater temperature range.

Also, the sheer block of the housing is larger in the present invention allowing room for a larger latch. A larger latch can be stronger and may have an increased service life. The larger latch due to the taller housing can handle larger loads.

The larger latch in combination with the use of only one spring allows greater ability to adapt the latch of the present invention. The shape of the contact and pivot surfaces of the latch's leg may be tailored to create various embodiments with a greater range of container engagement and release features.

BRIEF DESCRIPTION OF THE PREFERRED EMBODIMENT

A device for securing cargo containers to a vehicle deck or similar surface comprising a housing containing a latch mechanism that extends outwardly from the housing to engage a cargo container corner casting. The other side of the housing has a flat base that is tailored to interface with a vehicle deck or similar surface.

Where a cargo container is to be secured to a deck or frame of a vehicle or similar surface, the base of the housing is oriented and fastened in such a manner as to prevent its removal from the deck or vehicle. Welding and using fasteners are examples of appropriate fastening techniques. The appropriate corner fitting of the cargo container is brought into contact with the exposed end of the device latch mechanism that extends outwardly from the housing to engage the cargo container corner casting and secure it to the deck or frame of a vehicle. When appropriate force is exerted to pull the cargo container off of the deck, the devices latch mechanism that extends outwardly from the housing will automatically retract into the devices housing allowing the cargo container to be removed.

BRIEF DESCRIPTION OF THE DRAWINGS

FIG. 1 is a frontal elevational view of the latch device for cargo containers.

FIG. 2 is a side elevational view of the latch device for cargo containers.

FIG. 3 is a back elevational view of the latch device for cargo containers.

FIG. 4 is a top plan view of the latch device for cargo containers.

FIG. 5 is a bottom plan view of the latch device for cargo containers.

FIG. 12 is a sectional side elevational view showing the positions of the latch device's internal components just prior to the cargo container's corner fitting being removed from the device.

FIG. 13 is a sectional side elevational view showing the positions of the latch device's internal components during partial removal of the cargo container's corner fitting from the device.

FIG. 14 is a sectional side elevational view showing the positions of the latch device's internal components during partial removal of the cargo container's corner fitting from the device.

FIG. 15 is a sectional side elevational view showing the positions of the latch device's internal components retracted into the devices housing just after the cargo container's corner fitting has been removed from the device.

DETAILED DESCRIPTION OF THE PREFERRED EMBODIMENT

Figure 7:
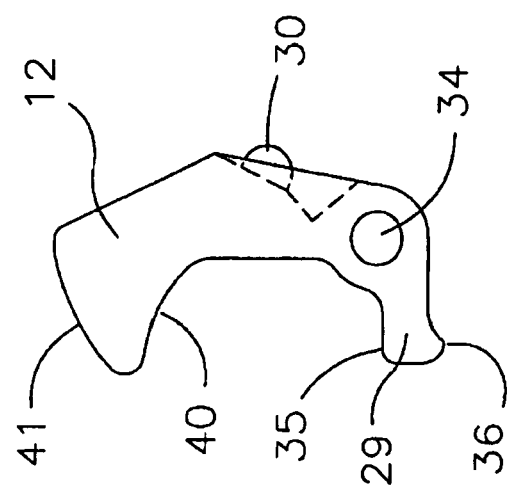
FIG. 7 is a side elevational view of the latch for the latch device.

The latch device 10 includes a housing 11, a latch 12, a pin 13, a spring 14 and two side screws 15 and 37. One side screw 15 or 37 is on each side of housing 11. An assembled frontal view of device 10 is shown in FIG. 1. An assembled side lateral view of device 10 is shown in FIG. 2. The housing 11 has a base bottom 16 that interfaces with the deck or vehicle or similar surface. The housing 11 has a base 18 which is spaced between a cargo container's corner fitting 21 and a vehicle deck's appropriate structure and surface 25.

The illustrations within this document show that the vehicle deck's appropriate structure and surface 25 is a flat structure. Surface 25 is described herein as a vehicle deck, but may be other types of surfaces. It is also to be noted that the scope of the design of latch device 10 is not to be limited to an appropriate structure and surface 25 being a flat structure. Housing 11, base bottom 16 and base 18 are allowed to be varied as defined by the user.

Figure 11:
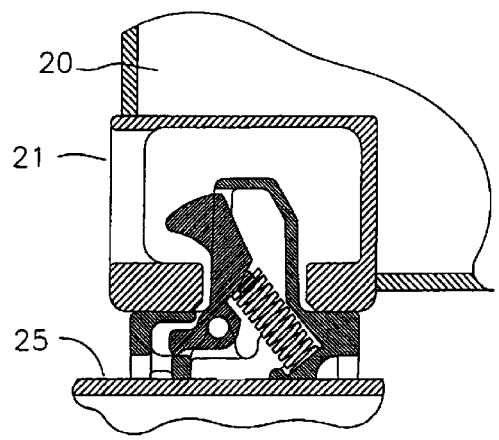
FIG. 11 is a sectional side elevational view showing the positions of the latch device's internal components while the cargo container's corner fitting is engaged with the device.

Housing 11 is adapted to accommodate latch 12. Housing 11 includes internal pockets 22 and 23 that accommodate pin 13 to secure latch 12 inside housing 11. Housing 11 also includes internal pocket 28 adapted to allow latch 12 to pivot therein. Housing 11 also includes cavity 42 adapted to accommodate spring 14. Internal housing surface 38 and surface 39 are adapted to contact surface 35 and 36 of leg 29 of latch 12 when latch 12 is in various positions. Surfaces 26 and 27 of housing 11 are adapted to accommodate pin 13 thereby allowing latch 12 to pivot in the desired positions. The typical application of latch device 10 is for securing a standard cargo container 20 onto a vehicle deck or frame surface 25 such as shown in FIG. 11.

The latch 12 as best seen in FIG. 7 includes a leg 29 at one end and a convex upper-side 41 at the opposite end. A latch aperture 34 is between the leg 29 and upper-side 41 to allow movement of the latch 12. Leg 29 includes an upper housing contact surface 35 and a lower housing contact surface 36 on opposite sides. Surfaces 35 and 36 engage internal housing surface 38 and 39 at different times depending on the position and movement of the latch 12. The convex upper-side 41 of latch 12 includes a concave underside 40 adapted to engage a surface of the corner casting 21 of a cargo container 20. Latch 12 includes a protrusion 30 preferably partially formed in a recess of latch 12. Protrusion 30 is adapted to accommodate one end of spring 14.

Figure 6:
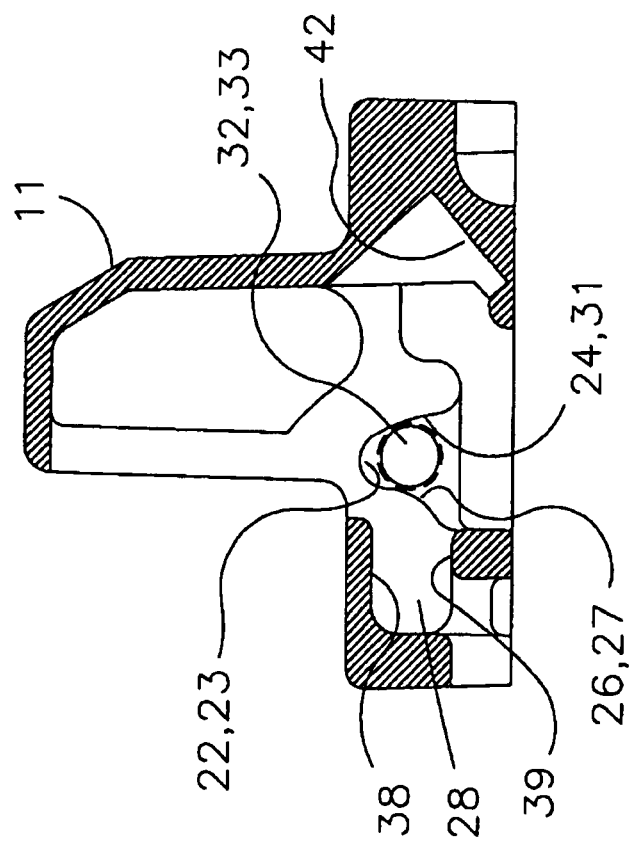
FIG. 6 is a sectional side elevational view of the housing for the latch device.

FIG. 6 illustrates side holes 32 and 33 in housing 11 that are used to insert pin 13 during assembly of device 10. Side screws 15 and 37 are installed into side holes 32 and 33 of housing 11 to assure that pin 13 remains within housing 11 during operation of device 10. Spring 14 operates between protrusion 30 of the latch 12 and cavity 42 of the housing 11. Spring 14 sits within cavity 42 in housing 11 and assures proper orientation of spring 14 during operation of device 10.

FIG. 12 represents the earliest operational stage of when a corner casting 21 of a standard cargo container 20 is being removed off of the latch device 10 and is starting to make contact with the concave underside 40 of latch 12. It is to be observed that latch 12 is secured in the internal pockets 22 and 23 of housing 11 by pin 13. In this illustration, latch aperture 34 is defined by a through hole. Pin 13 interfaces with pin receiving latch aperture 34. FIG. 5 shows the two ends 17 and 19 of pin 13 contact the internal housing pockets 22 and 23 respectively. Spring 14 being positioned onto the protrusion 30 of latch 12 assures that latch 12 is secured into proper position.

As corner casting 21 of a standard cargo container 20 is being removed off of the latch device 10 and is in contact with the concave underside 40 of latch 12. It is to be observed that latch 12 is pivoting about pin 13 in the internal pockets 22 and 23 of housing 11. Latch aperture 34 is contacting and pivoting about pin 13 in the internal housing pockets 22 and 23. Spring 14 being positioned onto the protrusion 30 of latch 12 assures that latch 12 translates and pivots through the desired motion. The actual location and shape of latch aperture 34 and internal housing pockets 22 and 23 are allowed to be tailored as desired to obtain the desired release action of the latch device 10.

FIG. 13 represents the operational stage of when a corner casting 21 of a standard cargo container 20 is being removed off of the latch device 10 and is making contact with the concave underside 40 of latch 12. It is to be observed that leg 29 of latch 12 has pivoted and rotated in the internal pocket 28 of housing 11 about pin 13. FIG. 13 shows that surface 35 of leg 29 of latch 12 is now coming into contact and pivoting about internal housing pocket 28 at surface 38. Pin 13 being positioned in the internal housing pockets 22 and 23 assures that latch 12 translates and pivots through the desired motion. The actual location and shape of latch surface 35 and internal housing surface 38 is allowed to be tailored as desired to obtain the desired release action of the latch device 10.

This two or more surface pivot and contact area 35 of latch 12 during the release action of latch device 10 is similar but unique from prior art Brewster U.S. Pat. No. 5,570,981. Latch 12 of latch device 10 is guided and restrained by a pin 13 but has an additional latch pivot area 35 about internal housing surface 38. Line of action 43 defines the travel line that the contact surfaces of corner casting 21 of a standard cargo container 20 travels while it is being removed off of or being placed onto the latch device 10. Typically, it is desired that latch aperture 34 contacting and pivoting about pin 13 in internal housing pockets 22 and 23 be near or to the right of line of action 43, which results in minimizing the mechanical force advantage of spring 14 illustrated in FIG. 13. Minimizing the mechanical force advantage of spring 14 during initial release motion of corner casting 21 aids in obtaining low applied forces and smooth startup motion of latch 12. After startup motion of latch 12, it is desired to increase the mechanical force advantage of spring 14 so as to minimize the required size of spring 14. This is accomplished by creating new pivot areas other than aperture 34 of latch 12 farther away and to the left of, or outboard of, line of action 43 as illustrated in FIG. 13 and previously described.

FIGS. 13, 14 and 15 represent operational stages further along when a corner casting 21 of a standard cargo container 20 is being removed off of the latch device 10 and eventually clearing contact with the concave underside 40 of latch 12. It is to be observed that latch 12 is pivoting in the internal pocket 28 of housing 11 by its leg 29. FIGS. 13, 14 and 15 show latch surface 35 is contacting and pivoting about internal housing pocket 28 at surface 38. It is allowed for latch surface 35 to be contoured and to contact and pivot about internal housing pocket 28 at surface 38 to obtain the desired release effect of latch device 10. Pin 13 being allowed rotate out of pockets 22 and 23 of housing 11 and translate along surfaces 26 and 27 of housing 11. Surfaces 26 and 27 of housing 11 are contoured to assure pin 13 and latch 12 translates and pivots through the desired motion. The actual location and shape of latch aperture 34 and surface 35 and internal housing pockets and surfaces 22, 23, 26, 27 and 38 are allowed to be tailored as desired to obtain the desired release action of the latch device 10.

Figure 8:
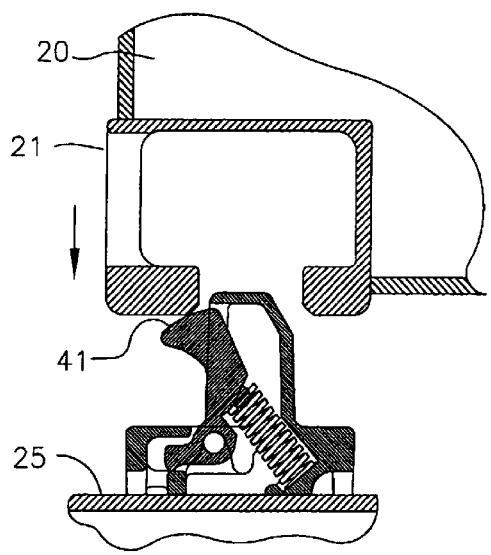
FIG. 8 is a sectional side elevational view showing the positions of the latch device's internal components just prior to the cargo container's corner fitting engaging with the device.

FIG. 8 represents the earliest operational stage of when a corner casting 21 of a standard cargo container 20 is engaging with latch device 10 and is starting to make contact with the convex upper-side 41 of latch 12. It is to be observed that latch 12 is secured in the internal pockets 22 and 23 of housing 11 by its pin 13. Latch surface 36 contacts internal housing at surface 39. Spring 14 being positioned onto the protrusion 30 of latch 12 assures that latch 12 is secured into proper position. As corner casting 21 of a standard cargo container 20 is engaging the latch device 10, container 20 and is in contact with the convex upper-side 41 of latch 12. Latch 12 pivots in the internal pocket 28 of housing 11 by its leg 29 when container 20 moves downward. Latch surface 36 is contacting and pivoting about internal housing pocket 28 at surface 39. Pin 13 being allowed rotate out of pockets 22 and 23 of housing 11 and translate along translation surfaces 24 and 31 of housing 11. Surfaces 24 and 31 of housing 11 are contoured to assure pin 13 and latch 12 translates and pivots through the desired motion. The actual location and shape of latch aperture 34 and surface 36 and internal pockets and housing surfaces 22, 23, 24, 31 and 39 are allowed to be tailored as desired to obtain the desired engagement action of the latch device 10.

Figure 9:
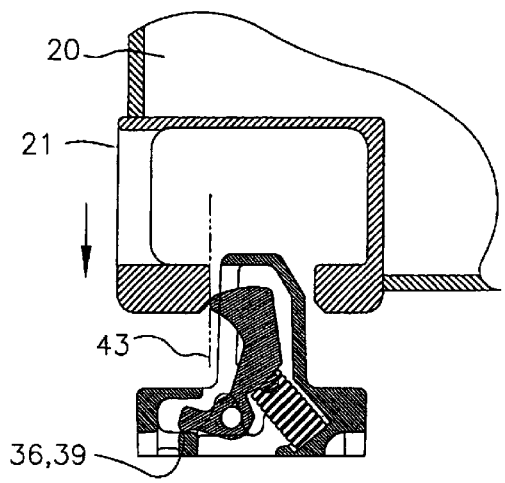
FIG. 9 is a sectional side elevational view showing the positions of the latch device's internal components partially retracted into the devices housing while the cargo container's corner fitting engaging onto the device.

It is to be observed that this pivot and contact area 36 of latch 12 during the engagement action of latch device 10 is similar to prior art Brewster U.S. Pat. No. 5,570,981. Line of action 43 defines the travel line that the contact surfaces of corner casting 21 of a standard cargo container 20 travels while it is engaging and being placed onto the latch device 10. Typically, it is desired that latch surface 36 contacting and pivoting about internal housing pocket 28 at surface 39 be as far away and to the left of line of action 43, which results in minimizing the mechanical force advantage of spring 14 as illustrated in FIG. 9. Minimizing the mechanical force advantage of spring 14 during the engagement motion of corner casting 21 aids in obtaining low applied forces and smooth engagement motion of latch 12.

Figure 10:
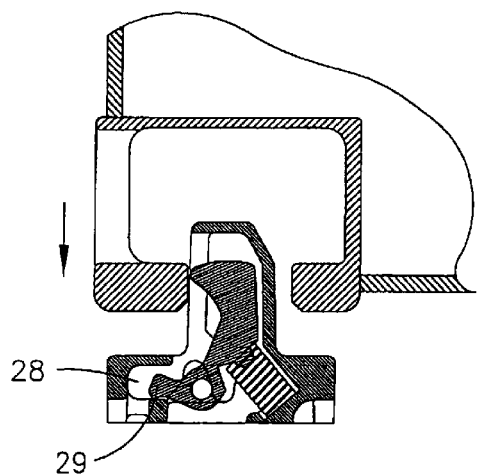
FIG. 10 is a sectional side elevational view showing the positions of the latch device's internal components fully retracted into the devices housing just after the cargo container's corner fitting has been engaged onto the device.

FIGS. 9 and 10 represents operational stages further along when a corner casting 21 of a standard cargo container 20 is being engaged onto latch device 10 and clears contact with the convex upper-side 41 of latch 12. It is to be observed that latch 12 is pivoting in the internal pocket 28 of housing 11 by its leg 29. FIG. 9 shows latch surface 36 is contacting and pivoting about internal housing pocket 28 at surface 39. Pin 13 being allowed rotate out of pockets 22 and 23 of housing 11 and translate along surfaces 24 and 31 of housing 11. Surfaces 24 and 31 of housing 11 are contoured to assure pin 13 and latch 12 translates and pivots through the desired motion. The actual location and shape of latch aperture 34 and surface 36 and internal housing pockets and surfaces 22, 23, 24, 31 and 39 are allowed to be tailored as desired to obtain the desired engagement action of the latch device 10.

Although the preferred embodiment of the invention is illustrated and described in connection with a particular type of latch, it can be adapted for use with a variety of latches. Other embodiments and equivalent latch devices and methods are envisioned within the scope of the invention. Various features of the invention have been particularly shown and described in connection with the illustrated embodiment of the invention; however, it must be understood that these particular embodiments merely illustrate and that the invention is to be given its fullest interpretation within the terms of the appended claims.

What is claimed is:

1. A latch device for releasably holding a cargo container comprising:

a housing a latch having, at one end, an upper convex surface located and shaped to engage a cargo container being lowered into latching engagement and a lower concave surface located and shaped to engage the cargo container being raised to release the latching engagement the latch having a housing engaging leg at a second end, the housing engaging leg having a first rigid surface shaped to pivotally engage a first surface of the housing when the cargo container is being lowered into latching engagement, the housing engaging leg having a second rigid surface shaped to pivotally engage a second surface of the housing when the cargo container is being raised to release the latching engagement, not more than one internal resilient element positioned to bias the latch to a locked position and to vary the latching forces being provided over the range of motion of the latch, and a pin movably mounted in the housing and supporting the latch between the latch one end and second end for pivotal and translational movement with respect to the housing.

2. The latch device of claim 1, further comprising:

contact and pivot surfaces being formed on the latch's leg;

said contact and pivot surfaces on said latch being formed and arranged so that during the release action of said latch device, after startup motion of latch the mechanical force advantage of said resilient element is increased so as to minimize the required size of said resilient element said pivot surfaces that is positioned farther away and to outboard of a line of action being a relative line at which the container fully engages and displaces the latch inward relative to the housing.

3. The latch device of claim 2, further comprising:

said latch mounted for pivoting about said pin;

said pin arranged for moving translationally within said housing as said latch is moved by interaction with the container.

4. The latch device of claim 3, further comprising:

said housing having a pin receiving pocket defined by translation surfaces;

said translational surfaces being arranged for guiding said pin between a first latch engaged position a second container lowering and locking position and a third container lifting and releasing position wherein said pin is in said first position when the container is locked or no container is engaged, said pin being arranged to move to said second position as a container is lowered and the container engagement of a convex upper surface of the latch forces the latch inward against resilient element pressure, and said pin being arranged to move to said third position as the container is lifted from the device and the container engagement of a convex lower surface of the latch forces the latch inward against resilient element pressure, the translation of the pin providing differing mechanical advantage against spring pressure, thereby varying the lifting and locking force on the container depending on the position and movement of the container.

5. The latch device of claim 4, further comprising:

the second position being farther from said line of action than the first position;

the third position being closer to said line of action than the first position.

6. A latch device for releasably holding a cargo container comprising:

a housing a latch having, at one end, an upper convex surface located and shaped to engage a cargo container being lowered into latching engagement and a lower concave surface located and shaped to engage the cargo container being raised to release the latching engagement the latch having a housing engaging leg at a second end, the housing engaging leg having a first rigid surface shaped to pivotally engage a first surface of the housing when the cargo container is being lowered into latching engagement, the housing engaging leg having a second rigid surface shaped to pivotally engage a second surface of the housing when the cargo container is being raised to release the latching engagement, an internal resilient element having a first end and a second end, the first end being positioned on the housing and the resilient element second end being positioned between the latch one end and latch second end to bias the latch to a locked position and to vary the latching forces being provided over the range of motion of the latch, and a pin movably mounted in the housing and supporting the latch for pivotal and translational movement with respect to the housing.

7. The latch device of claim 1, further comprising a curved surface joining the upper convex surface and lower concave surface, wherein the curved surface extends about an arc of less than 170°.

8. The latch device of claim 6, further comprising the resilient element is positioned to bias the latch to pivot about the pin.

9. The latch device of claim 1, wherein the latch is generally C-shaped.

* * * * *